Feb. 17, 1948.  W. H. ARMISTEAD  2,435,995
OPTICAL GLASS
Filed Sept. 4, 1945
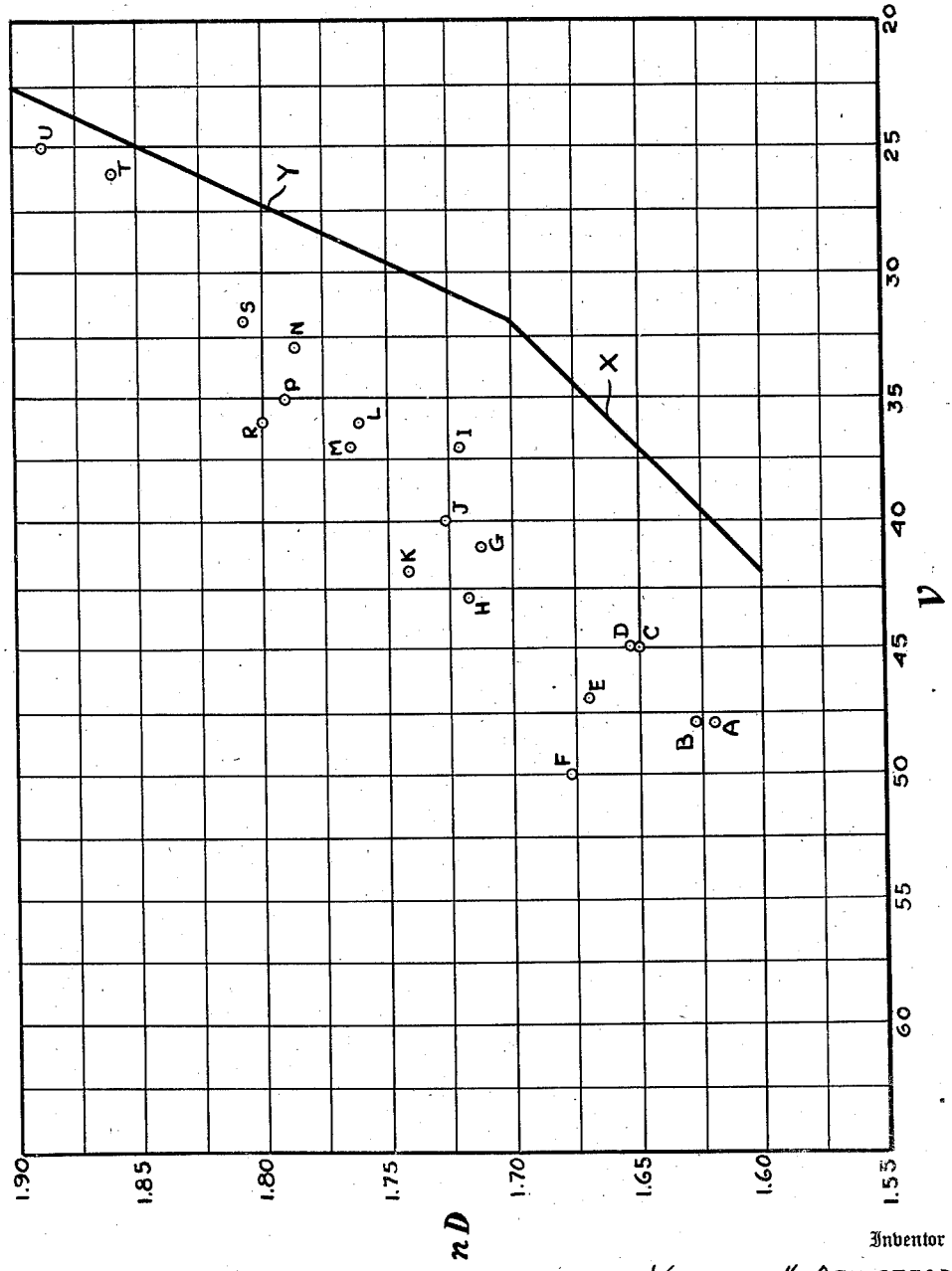
Inventor
WILLIAM H. ARMISTEAD
By Knight & Fowler
Attorneys Patented Feb. 17, 1948

2,435,995

UNITED STATES PATENT OFFICE 2,435,995

OPTICAL GLASS

William H. Armistead, Corning, N. Y., assignor to Corning Glass Works, Corning, N. Y., a corporation of New York Application September 4, 1945, Serial No. 614,288

16 Claims. (Cl. 106—52)

This invention relates to optical glass compositions and particularly to compositions which have an index of refraction for the D line ($nD$) greater than 1.60 and which are suitable for use in optical instruments and devices of various kinds.

Heretofore the most common optical glasses having a refractive index greater than 1.60 have been the so-called dense flint or lead glasses having a high lead content. The flint glasses have a relatively low dispersive index ($v$) or nu value, as it is sometimes called, which decreases as the lead content and refractive index are increased. For some purposes, such as for designing objective lenses for use in aerial photography, a glass having a high dispersive index as well as a high refractive index is desirable. Moreover, lead oxide is appreciably volatile at glass melting temperatures and the optical properties of glasses having high lead contents are difficult to control.

It has heretofore been shown that certain cadmium borate glasses consisting practically entirely of cadmium oxide, boric oxide and beryllium or aluminum oxide but free from silica have the desired optical properties. The prior cadmium containing glasses are not sufficiently stable and resistant to devitrification for my purposes, and tend to crystallize when annealed or reworked for the fabrication of lenses and other optical parts. This tendency toward devitrification increases with the cadmium content and prevents the successful fabrication of glasses containing more than about 60% CdO and having refractive indices above about 1.70.

The primary object of this invention is to provide new and useful optical glasses.

Another object is to provide glasses which have an index of refraction ($nD$) greater than 1.60 and a dispersive index ($v$) higher than has heretofore been obtainable in the well known alkali-lead silicate glasses of high refractive index.

Another object is to provide optical glasses having the above optical properties, which are composed of non-volatile materials, can be melted and fined easily and are relatively cheap.

Another object is to provide optical glasses containing large percentages of cadmium oxide which are chemically stable and highly resistant to devitrification.

Other objects will hereinafter appear.

I have found that certain silicate glasses with high cadmium contents have the desired optical properties as will hereinafter appear, and also have improved chemical durability and greatly increased resistance to devitrification. By means of the invention, stable glasses can be produced which have cadmium contents as high as 80% CdO and refractive indices as high as about 1.8 and which will not devitrify when reheated to softness for molding. The new glasses must contain at least 20% CdO and at least 2% SiO$_2$. Preferably they should also contain at least 2% Al$_2$O$_3$ and at least 2% B$_2$O$_3$. The B$_2$O$_3$ should not exceed 40% at the most and preferably should not exceed about 15%, and may be entirely omitted when CdO is less than about 70%. Alumina, on the other hand, should not exceed about 30% and may be omitted when CdO is more than about 70%. In other words, the new glasses broadly comprise 20% to 80% CdO, 2% to 50% SiO$_2$, 0% to 30% Al$_2$O$_3$, and 0% to 40% B$_2$O$_3$.

I have further found that substantial amounts of the divalent oxides of the heavy metals, lead and barium, not exceeding about 55%, and also amounts of alkali-metal oxides (R$_2$O) not exceeding about 20%, and small amounts of zirconia, can be introduced into the above glasses with advantageous improvements in stability and optical properties. In case the glasses contain substantial amounts of additional metal oxides, such as PbO or R$_2$O, both the alumina and boric oxide may be omitted if desired without seriously affecting the stability or optical properties. The presence of zirconia in amounts as large as 5% or more necessitates a decrease in the amount of alumina in order for the zirconia to become dissolved in the glass. Other oxides which are commonly used in optical glass compositions such as BeO, ZnO, TiO$_2$, etc., may also be included in the new glasses without departing from the spirit and scope of the invention as claimed.

The following glasses, which are given in percent by weight as calculated from their respective batches, show by way of example compositions which I have melted and which fall within the scope of my invention.

|        | A      | B      | C      | D      | E      | F      | G      | H      |
|--------|--------|--------|--------|--------|--------|--------|--------|--------|
| $SiO_2$ | 35     | 30     | 30     | 30     | 15     | 20     | 23     | 10     |
| CdO    | 40     | 40     | 50     | 50     | 35     | 25     | 60     | 30     |
| $Al_2O_3$ | 20  | 25     | 15     | 20     | 10     | 5      | 10     | 5      |
| $B_2O_3$ | 5    | 5      | 5      |        | 15     | 10     | 5      | 10     |
| BaO    |        |        |        |        | 25     | 40     |        | 45     |
| $Li_2O$ |        |        |        |        |        |        | 2      |        |
| nD     | 1.6195 | 1.6268 | 1.6503 | 1.6525 | 1.6697 | 1.6777 | 1.7125 | 1.7179 |
| ν      | 48     | 48     | 45     | 45     | 47     | 50     | 41     | 43     |

|        | I      | J      | K      | L      | M      | N      | P      | R      |
|--------|--------|--------|--------|--------|--------|--------|--------|--------|
| $SiO_2$ | 30    | 20     | 10     | 10     | 15     | 10     | 20     | 15     |
| CdO    | 65     | 65     | 30     | 70     | 70     | 75     | 75     | 70     |
| $Al_2O_3$ |     | 5      |        | 10     | 5      | 5      |        |        |
| $B_2O_3$ |     | 10     | 10     | 10     | 10     | 10     | 5      | 10     |
| BaO    |        |        | 45     |        |        |        |        |        |
| $ZrO_2$ |      |        | 5      |        |        |        |        | 5      |
| $Na_2O$ | 2    |        |        |        |        |        |        |        |
| $K_2O$ | 3     |        |        |        |        |        |        |        |
| nD     | 1.7216 | 1.7269 | 1.7417 | 1.7614 | 1.7645 | 1.7863 | 1.7917 | 1.7998 |
| ν      | 37     | 40     | 42     | 36     | 37     | 33     | 35     | 36     |

|        | S      | T      | U      |
|--------|--------|--------|--------|
| $SiO_2$ | 5     | 7.5    | 18     |
| CdO    | 75     | 60     | 40     |
| $Al_2O_3$ | 10  | 5      |        |
| $B_2O_3$ | 10   | 7.5    | 2      |
| PbO    |        | 20     | 40     |
| nD     | 1.8067 | 1.8604 | 1.8883 |
| ν      | 32     | 26     | 25     |

The above glasses are chemically stable and resistant to devitrification when heated to softness for molding. It will be noted that they have refractive indices greater than 1.60 and relatively high dispersive indices.

To illustrate the relationship between $nD$ and $ν$ for the glasses of this invention, reference is had to the accompanying drawing which is a diagram representing the value of $nD$ for the above glasses plotted against their respective values of $ν$ and designated by the letters of the respective glasses. It will be noted that the values for the various glasses are above the lines X and Y which represent the approximate minima in the values for $nD$ and $ν$ which characterize the glasses of this invention.

The line X is drawn through the points $(nD=1.60, ν=42)$ and $(nD=1.70, ν=32)$ and is defined by the equation $$ν=202-100\ nD$$

The line Y is drawn through the points $(nD=1.70, ν=32)$ and $(nD=1.85, ν=25)$ and is defined by the equation $$ν=111.4-46.6\ nD$$

I claim:

1. A transparent optical glass which contains 20% to 80% CdO, 2% to 50% $SiO_2$, 0% to 30% $Al_2O_3$ and 0% to 40% $B_2O_3$ and which has an index of refraction for the D line ($nD$) of at least 1.60 and a dispersive index ($ν$) greater than both $ν=202-100\ nD$ and $ν=111.4-46.6\ nD$.

2. A transparent optical glass which contains 20% to 80% CdO, 2% to 50% $SiO_2$, and 2% to 40% $B_2O_3$, and which has an index of refraction for the D line ($nD$) of at least 1.60 and a dispersive index ($ν$) greater than both $ν=202-100\ nD$ and $ν=111.4-46.6\ nD$.

3. A transparent optical glass which contains 20% to 80% CdO, 2% to 50% $SiO_2$, and 2% to 15% $B_2O_3$, and which has an index of refraction for the D line ($nD$) of at least 1.60 and a dispersive index ($ν$) greater than both $ν=202-100\ nD$ and $ν=111.4-46.6\ nD$.

4. A transparent optical glass which contains 20% to 80% CdO, 2% to 50% $SiO_2$, 2% to 30% $Al_2O_3$ and 2% to 40% $B_2O_3$, and which has an index of refraction for the D line ($nD$) of at least 1.60 and a dispersive index ($ν$) greater than both $ν=202-100\ nD$ and $ν=111.4-46.6\ nD$.

5. A transparent optical glass which contains 20% to 80% CdO, 2% to 50% $SiO_2$, and up to 55% PbO, and which has an index of refraction for the D line ($nD$) of at least 1.60 and a dispersive index ($ν$) greater than both $ν=202-100\ nD$ and $ν=111.4-46.6\ nD$.

6. A transparent optical glass which contains 20% to 80% CdO, 2% to 50% $SiO_2$, up to 55% PbO, and 2% to 40% $B_2O_3$, and which has an index of refraction for the D line ($nD$) of at least 1.60 and a dispersive index ($ν$) greater than both $ν=202-100\ nD$ and $ν=111.4-46.6\ nD$.

7. A transparent optical glass which contains 20% to 80% CdO, 2% to 50% $SiO_2$, up to 55% PbO, and 2% to 15% $B_2O_3$, and which has an index of refraction for the D line ($nD$) of at least 1.60 and a dispersive index ($ν$) greater than both $ν=202-100\ nD$ and $ν=111.4-46.6\ nD$.

8. A transparent optical glass which contains 20% to 80% CdO, 2% to 50% $SiO_2$, $ZrO_2$, and 2% to 40% $B_2O_3$, and which has an index of refraction for the D line ($nD$) of at least 1.60 and a dispersive index ($ν$) greater than both $ν=202-100\ nD$ and $ν=111.4-46.6\ nD$.

9. A transparent optical glass which contains 20% to 80% CdO, 2% to 50% $SiO_2$, .1% to 20% alkali metal oxide, and which has an index of refraction for the D line ($nD$) of at least 1.60 and a dispersive index ($ν$) greater than both $ν=202-100\ nD$ and $ν=111.4-46.6\ nD$.

10. A transparent optical glass which contains 20% to 80% CdO, 2% to 50% $SiO_2$, .1% to 20% alkali metal oxide, and 2% to 30% $Al_2O_3$, and which has an index of refraction for the D line ($nD$) of at least 1.60 and a dispersive index ($ν$) greater than both $ν=202-100\ nD$ and $ν=111.4-46.6\ nD$.

11. A transparent optical glass which contains 20% to 80% CdO, 2% to 50% $SiO_2$, .1% to 20% alkali metal oxide, and 2% to 15% $B_2O_3$, and which has an index of refraction for the D line ($nD$) of at least 1.60 and a dispersive index ($ν$) greater than both $ν=202-100\ nD$ and $ν=111.4-46.6\ nD$.

12. A transparent optical glass which contains 20% to 80% CdO, 2% to 50% $SiO_2$, .1% to 20% alkali metal oxide and up to 55% PbO, and which has an index of refraction for the D line ($nD$) of at least 1.60 and a dispersive index ($ν$) greater than both $ν=202-100\ nD$ and $ν=111.4-46.6\ nD$.

13. A transparent optical glass which contains 20% to 80% CdO, 2% to 50% $SiO_2$ and 2% to 30% $Al_2O_3$, and which has an index of refraction for the D line ($nD$) of at least 1.60 and a dispersive index ($ν$) greater than both $ν=202-100\ nD$ and $ν=111.4-46.6\ nD$.

14. A transparent optical glass which contains 20% to 80% CdO, 2% to 50% $SiO_2$, up to 55% PbO and 2% to 30% $Al_2O_3$, and which has an index of refraction for the D line ($nD$) of at least 1.60 and a dispersive index ($ν$) greater than both $ν=202-100\ nD$ and $ν=111.4-46.6\ nD$.

15. A transparent optical glass which contains 20% to 80% CdO, 2% to 50% $SiO_2$, .1% to 20% alkali metal oxide, up to 55% PbO and 2% to 15% $B_2O_3$, and which has an index of refraction for the D line ($nD$) of at least 1.60 and a dispersive index ($ν$) greater than both $ν=202-100\ nD$ and $ν=111.4-46.6\ nD$.

16. A transparent optical glass which contains 20% to 80% CdO, 2% to 50% $SiO_2$, .1% to 20% alkali metal oxide, up to 55% PbO and 2% to 30% $Al_2O_3$, and which has an index of refraction for the D line ($nD$) of at least 1.60 and a dispersive index ($\nu$) greater than both $\nu=202-100\ nD$ and $\nu=111.4-46.6\ nD$.

WILLIAM H. ARMISTEAD.

REFERENCES CITED

The following references are of record in the file of this patent:

UNITED STATES PATENTS

| Number | Name | Date |
|---|---|---|
| 2,298,746 | Moulton | Oct. 13, 1942 |

Disclaimer 2,435,995.—*William H. Armistead*, Corning, N. Y. OPTICAL GLASS. Patent dated Feb. 17, 1948. Disclaimer filed Nov. 20, 1951, by the assignee, *Corning Glass Works*.

Hereby enters this disclaimer to claims 1, 2, 5, and 6 of said patent.
[*Official Gazette December 25, 1951.*]